(No Model.) 2 Sheets—Sheet 1.

J. HESELWOOD.
MACHINE FOR WASHING CLOTHES.

No. 595,102. Patented Dec. 7, 1897.

Witnesses
Chas. H. Smith
J. Staib

Inventor
James Heselwood
per Lemuel W. Serrell
Atty.

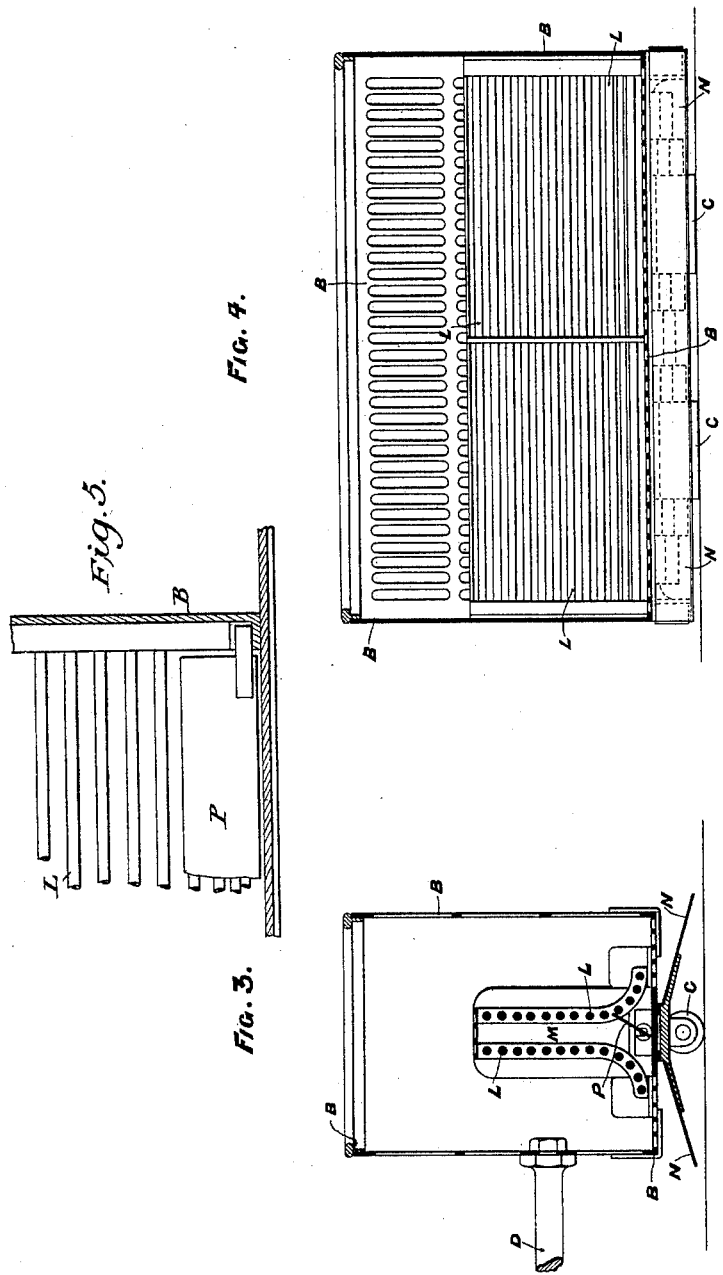

UNITED STATES PATENT OFFICE.

JAMES HESELWOOD, OF LEEDS, ENGLAND.

MACHINE FOR WASHING CLOTHES.

SPECIFICATION forming part of Letters Patent No. 595,102, dated December 7, 1897.

Application filed June 14, 1897. Serial No. 640,690. (No model.)

*To all whom it may concern:*

Be it known that I, JAMES HESELWOOD, a subject of the Queen of Great Britain and Ireland, and a resident of Leeds, in the county of York, England, have invented certain new and useful Improvements in Machines for Washing Clothes, of which the following is a specification.

My invention relates to machines for washing clothes and other fabrics; and the object of the said invention is to construct machinery in such a manner that the clothes under treatment are not rubbed or milled in any way, but are cleansed by the direct action of the water and the ingredients contained therein.

Figure 1:
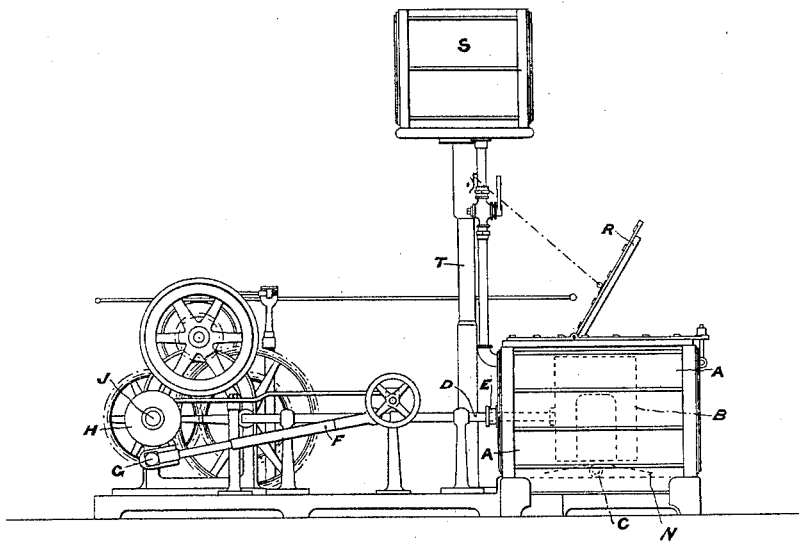
Figure 2:
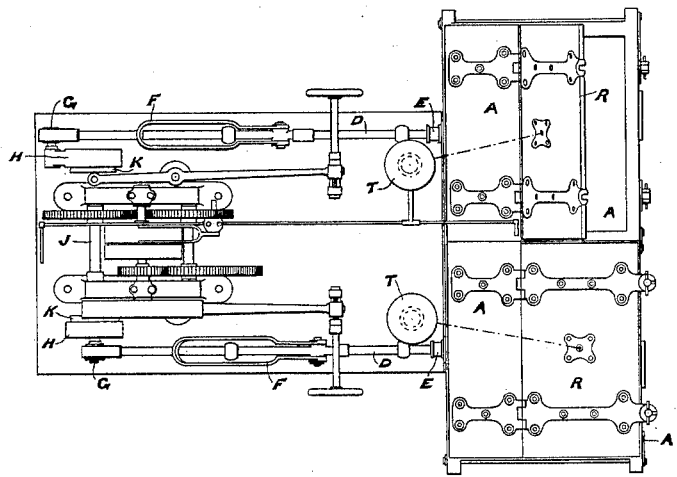

Referring to the drawings which form a part of this specification, Figure 1 is a side elevation of a machine constructed according to my invention, and Fig. 2 is a plan of same. Figs. 3 and 4 are respectively transverse and longitudinal sections showing a portion of said machine drawn to an enlarged scale. Fig. 5 is a section showing one end of the pivoted deflector-plate.

According to my invention I construct a rectangular tank A, and within the said tank A, I provide a cage B, which is mounted on rollers C to enable it to reciprocate within the tank A. The face of the cage B is attached to a rod D, which latter passes through the side of the tank A by way of a suitable gland or stuffing-box E. Outside the tank the rod D is connected by means of a suitable connecting-link F to a crank-pin G on a disk H, which latter is mounted on a shaft J and is capable of being connected or disconnected thereto by means of a suitable clutch K.

The upper part of the cage B is open, and the interior of the cage is divided by a partition composed of two perforated walls L, the space M between the said walls L being open to the perforations at the base of the cage B. On the under side of the said cage B deflecting-plates N are provided for the purpose of deflecting the water upward into the partition during the reciprocations of the cage B, and a hinged deflecting-plate P is provided in the base of the partition for the purpose of directing the inflow of water in an upward direction and thence through one of the walls L to the interior of the cage B. This deflector-plate P is provided with pivots, as seen in Fig. 5, near the lower part of each end, and it is swung into an inclined position either one way or the other by the action of the water as the cage B is reciprocated.

The upper part of the tank A is provided with a door R for the insertion of the clothes into the cage B, and the weight of the door R is supported by means of a counterbalance-weight. A cistern S is provided on pillars T above the apparatus for the purpose of supplying water to the tank A, and the water may be either hot or cold and can contain cleansing ingredients, if desired.

The clothes to be treated are distributed on both sides of the partition within the cage B, and on the reciprocating of the rod D the said cage B is drawn swiftly backward and forward, causing the water in the tank A not only to be forced through the sides of the cage B against the clothes, but to be forced upward into the interior of the partition and through the walls L against the interior of the clothes, which action causes the said clothes to become quickly and thoroughly cleansed and this without rubbing or milling same.

In the drawings at Figs. 1 and 2 the machine is shown in duplicate; but it will be readily understood that such machine may be of single, double, or other compound form to suit varying requirements and the amount of work to be done.

I claim as my invention—

1. In a machine for washing clothes, a tank for containing water, a cage and rollers for supporting the same within the tank, a central perforated partition in the cage, and deflecting-plates at each side and below the cage, substantially as set forth.

2. In a machine for washing clothes, the combination with the tank for holding water, of a cage having open-work sides and a perforated bottom and means for reciprocating the same, and a double central open-work partition, deflecting-plates below the cage and a hinged deflecting-plate for throwing the water alternately through the opposite walls of the partition, substantially as set forth.

In witness whereof I have hereunto set my hand in presence of two witnesses.

JAMES HESELWOOD.

Witnesses:
GRIFFITH BREWER,
JOHN JOWETT.